United States Patent [19]

Kimura

[11] Patent Number: 4,632,433
[45] Date of Patent: Dec. 30, 1986

[54] DEVICE FOR CONNECTING TUBES

[75] Inventor: Shigeru Kimura, Kamakura, Japan

[73] Assignee: Nifco Inc., Yokohama, Japan

[21] Appl. No.: 772,313

[22] Filed: Sep. 4, 1985

[30] Foreign Application Priority Data

Sep. 7, 1984 [JP] Japan .................. 59-135094[U]

[51] Int. Cl.⁴ .................................. F16L 17/00
[52] U.S. Cl. ........................... 285/38; 285/307; 285/331; 285/348; 285/360; 285/361; 285/281; 285/376
[58] Field of Search ........... 285/360, 376, 401, 402, 285/348, 396, 330, 331, 377, 38, 307, 348, 361, 281

[56] References Cited

U.S. PATENT DOCUMENTS

| | | | |
|---|---|---|---|
| 643,358 | 2/1900 | Konold | 285/360 |
| 762,350 | 6/1904 | Rehnstrom | 285/401 |
| 796,306 | 8/1905 | Exley | 285/330 |
| 1,031,587 | 7/1912 | Reisik | 285/330 |
| 1,181,060 | 4/1916 | Bennett | 285/361 |
| 1,253,065 | 1/1918 | Looze | 285/360 |
| 1,333,342 | 3/1920 | Robertson et al. | 285/377 |
| 1,591,871 | 7/1926 | Heinrich | 285/360 |
| 1,806,278 | 5/1931 | Boker | 285/376 |
| 1,885,321 | 11/1932 | Benn | 285/331 |
| 2,441,344 | 5/1948 | Bosworth | 285/348 |

Primary Examiner—Cornelius J. Husar
Assistant Examiner—Anthony Knight
Attorney, Agent, or Firm—Trexler, Bushnell & Wolters, Ltd.

[57] ABSTRACT

A device for connecting together tubes or pipes is disclosed, which comprises a cylindrical male coupler provided on one end of a first tube or pipe and having an engagement projection formed on the outer periphery, and a female coupler provided on one end of a second tube or pipe and having a helical engagement notch for receiving the engagement projection. The two couplers can be tightly coupled together by fitting the male coupler to the female coupler such that the engagement projection is received in the helical engagement notch and then turning the couplers relative to each other.

5 Claims, 8 Drawing Figures

DEVICE FOR CONNECTING TUBES

FIELD OF THE INVENTION AND RELATED ART STATEMENT

This invention relates to a device for connecting together tubes for transporting a fluid.

A connecting device is usually used for connecting and disconnecting tubes or pipes used for a fluid supply system. It is desired that the device of this type be capable of being simply mounted and removed and that it ensure reliable gas-tightness or water-tightness.

A prior art device of this type is disclosed, for instance, in Japanese Utility Model Publication SHO No. 59(1984)-41522. The disclosed device comprises an outer cylinder and an inner cylinder which can be fitted together. The inner cylinder has a plurality of pins projecting from its outer peripheral surface, while the outer cylinder has a substantially J-shaped groove extending from an edge thereof for receiving the pins. When coupling together the outer and inner cylinders, the pins of the inner cylinder are received in the J-shaped groove of the outer cylinder and moved toward the inner end of the groove. The pins can be brought to the inner end of the J-shaped groove by inserting the pins in the groove from the outer end thereof in the axial direction, then turning the inner cylinder such that the pins are moved in the circumferential direction and then slightly returning the pins in the axial direction. When the inner and outer cylinders are coupled together, they are spring biased toward each other by a spring so that the pins will not be readily detached from the J-shaped groove. However, if a force surpassing the biasing force of the spring is exerted on the inner and outer cylinders in the normal working state, detachment of the pins from the J-shaped groove is liable to result. Further, the coupled state is not positively maintained, so that rattling is likely. With the prior art connecting device, the coupled state is instable, and the reliability is inferior.

OBJECT AND SUMMARY OF THE INVENTION

An object of the invention is to provide a device for connecting together tubes or pipes, which is provided on mating ends of two tubes or pipes and permits ready connection and disconnection of the two tubes or pipes while maintaining a tight and reliable connected state.

To attain the above object of the invention, there is provided a device for connecting together tubes or pipes, which comprises a cylindrical male coupler provided on one end of a first tube or pipe, and a cylindrical female coupler provided on one end of a second tube or pipe and having an inner diameter capable of receiving the male coupler, the male coupler having at least one engagement projection provided on the outer periphery, the female coupler being provided with a helical engagement notch for receiving the engagement projection.

To connect together the two tubes or pipes, the male and female couplers provided on the ends of the tubes or pipes are first fitted together. At this time, the engagement projection of the male coupler is received in the engagement notch formed in the female coupler. In this state, the female coupler is turned, whereby the two couplers are coupled together to tightly connect the tubes or pipes together. The connected tubes or pipes can be disconnected by turning the female coupler in the opposite direction.

Thus, the tubes or pipes can be readily connected and disconnected, and also a tight connected state can be maintained.

The above and other objects and features of the invention will be more apparent from the detailed description of the preferred embodiment when the same is read with reference to the accompanying drawings.

DETAILED DESCRIPTION OF THE PREFERRED EMBODIMENT

Figure 1:
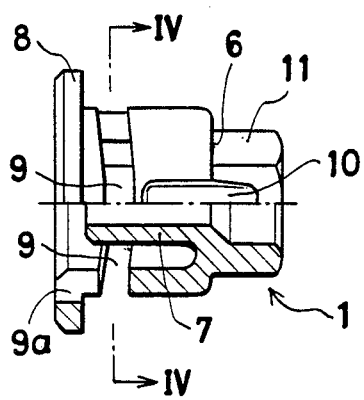
FIG. 1 is a front view, partially in section, showing a female coupler of one embodiment of the device for connecting together tubes or pipes according to the present invention.
Figure 2:
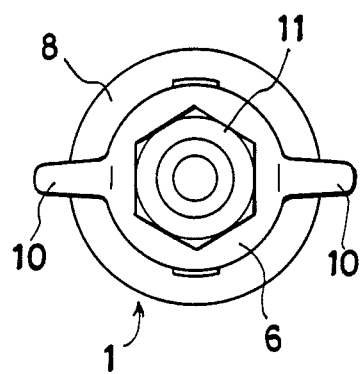
FIG. 2 is a right side view of the female coupler of FIG. 1.
Figure 3:
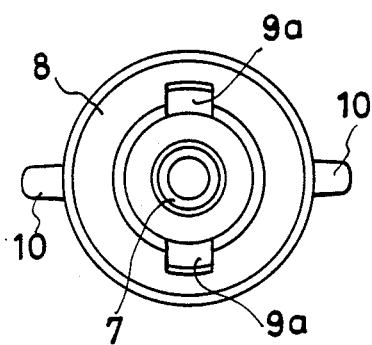
FIG. 3 is a left side view of the female coupler of FIG. 1.
Figure 4:
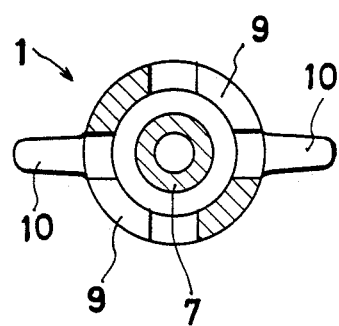
FIG. 4 is a sectional view taken along line IV—IV in FIG. 1.

An embodiment of the connecting device according to the invention will now be described with reference to the drawings. Reference numeral 1 designates a female coupler provided on one end of a tube or pipe "A", and numeral 2 a male coupler provided on one end of a tube or pipe "B".

The male coupler 2 is cylindrical and is integral with the end of the tube "B". It is open at the free end, and has a shoulder 3 provided at the boundary between itself and the passage of the tube "B". Its outer periphery is provided with a pair of diametrically opposite locking projections 4 and a flange 5 facing the projections.

The female coupler 1 is cylindrical and capable of receiving the male coupler 2. It has a double wall structure with an inner coaxial cylindrical portion 7 extending from an end 6, an annular space being formed between the outer and inner cylindrical portions. The outer cylindrical portion has an outer flange 8 provided at its open end, and has two helical engagement notches 9 extending from this open end. In this embodiment, the female coupler 1 has notches 9a formed at the open end, and the helical engagement notches 9 extend from the notches 9a up to substantially a quarter of the outer cylindrical portion.

The inner cylindrical portion 7 of the female coupler 1 serves as a tube retainer for retaining the tube "A" inserted therethrough. The end of the tube "A" has an outer flange-like projection "a", which can engage the end of the inner cylindrical portion 7, whereby the tube "A" can be retained in the inner cylindrical portion 7. The outer periphery of the female coupler 1 is provided with a pair of projections 10 which serve as knob means for turning the coupler. The coupler 1 also has a nut portion 11 having a hexagonal outer periphery rearwardly extending from the end 6 and operable with a spanner or like tool for turning the coupler 1. The inner side of the outer flange 5 of the male coupler 2 is provided with stoppers 12 which are angularly spaced substantially by 45 degrees from the engagement projections 4.

The male and female couplers of the connecting device having the above construction are separately formed from a thermosetting plastic resin having some degree of elasticity, i.e., a nylon resin. Of the two couplers of the connecting device, the male coupler is preliminarily made integral with a tube or pipe to be connected, and another tube or pipe to be connected is coupled to the female coupler.

As mentioned before, the tube "A" is inserted through the inner cylindrical portion 7 of the female coupler 1 until the outer flange-like projection "a" engages the end of the inner cylindrical portion 7.

Two tubes are connected together with the two couplers of the connecting device in the following way. The open end of the female coupler 1 is held such that it faces the male coupler 2 provided on the tube "B", and it is then advanced toward the male coupler. The inner cylindrical portion 7 thus is received in the male coupler 2. At this time, the engagement projections 4 provided on the outer periphery of the male coupler 2 are engaged in the notches 9a communicating with the helical engagement notches 9 of the female coupler 1. When the engagement between the projections 4 and notches 9 is obtained, the female coupler 1 is turned by turning the projections 10 with the fingers or with a spanner or like tool fitted on the nut portion, whereby the engagement projections 4 are guided along the helical engagement notches 9 such that the couplers 1 and 2 are pulled and tightened together.

Figure 5:
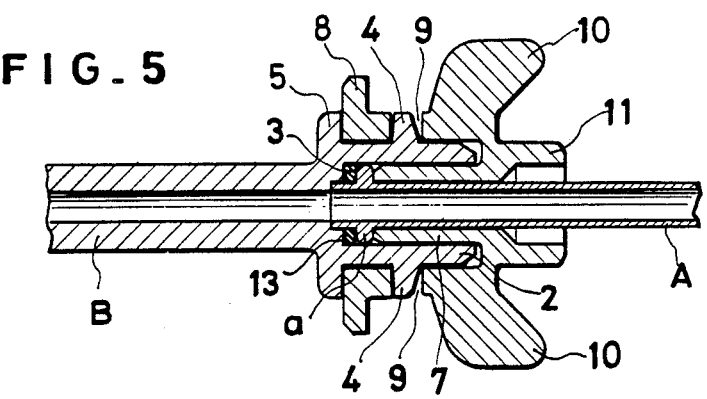
FIG. 5 is a laterally sectioned plan view showing the embodiment of the device with tubes or pipes coupled together.
Figure 6:
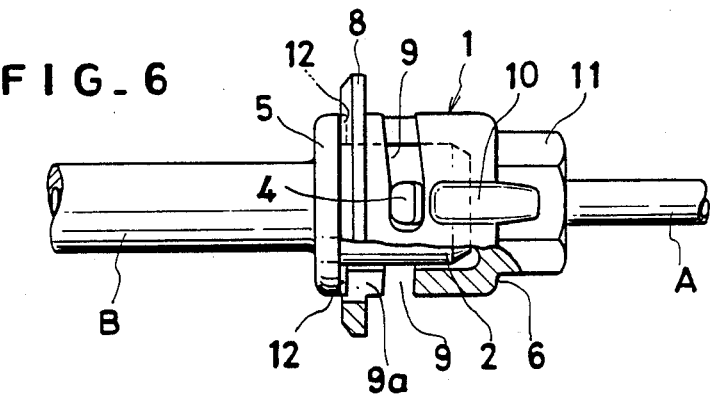
FIG. 6 is a front view, partially in section, showing the embodiment of the device with tubes or pipes coupled together.
Figure 7:
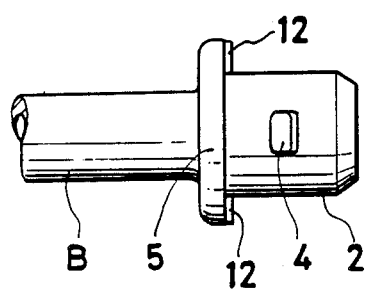
FIG. 7 is a front view showing a male coupler of the embodiment of the device for connecting together tubes or pipes according to the present invention.
Figure 8:
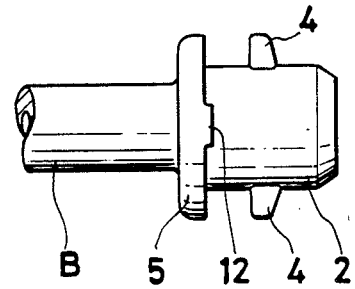
FIG. 8 is a plan view of the male member of FIG. 7.

FIGS. 5 and 6 show the two couplers as tightly coupled. In this state, the female and male couplers 1 and 2 are tightly pulled together with the engagement projections 4 guided to the bottom of the engagement notches 9, and the end of the tube "A" engaged with the end of the inner cylindrical portion 7 is urged via an O-ring 13 against the shoulder 3 of the male coupler 2 coupled to the tube "B". The stoppers 12 provided on the flange 5 of the male coupler 2 in contact with the flange 8 of the female coupler 1 are forced into the notches 9a communicating with the helical engagement notches 9 by causing flexing of the flange 5. These stoppers 12 thus prevent free rotation of the female coupler.

As has been shown, with the connecting device according to the invention the female and male couplers 1 and 2 may be simply coupled together to effect connection of tubes or pipes by merely fitting them together and turning them relative to each other. Besides, since the two couplers are pulled together by the coupling operation, they can be tightly coupled together. The connecting device thus is very suited as a connector for connecting tubes or pipes for transporting fluids under pressure.

Further, with the connecting device according to the invention, as the couplers are tightened together by the rotation thereof, the stoppers 12 provided on the flange 5 are engaged in the notches 9a to prevent loosening. Thus, stable connection can be obtained.

In the above embodiment, the stoppers 12 are provided in association with the notches 9a and are adapted to be engaged in these notches 9a when the coupler is tightened sufficiently for the engagement projections 4 to progress to the inner end of the engagement notches 9. The same effects may also be obtained by providing the surface of the flange 8 with recesses corresponding to the notches 9a such that the stoppers are associated with these recesses.

With the connecting device according to the invention, the two couplers can be molded, although separately, from a synthetic resin material. The device is thus suited for mass production. Further, since the couplers have slight elasticity, tight coupling can be obtained by making use of the elasticity when the two couplers are tightened together.

What is claimed is:

1. A device for connecting together tubes or pipes comprising a cylindrical male coupler mounted on one end of a first tube or pipe, and a cylindrical female coupler mounted on one end of a second tube or pipe and having an inner cylindrical portion capable of receiving said male coupler, said male coupler having at least one engagement projection provided on its outer periphery, said female coupler being provided with at least one helical engagement notch opening axially at one end of said female coupler and forming an inlet for said engagement notch for receiving said at least one engagement projection, and at least one locking projection on said male coupler engaging in said inlet with said male coupler and said female coupler fully engaged to lock said couplers against unauthorized separation.

2. The device for connecting together tubes or pipes according to claim 1, wherein said female coupler has a small diameter coaxial inner cylindrical portion, said second tube or pipe having an outer flange-like projection provided at its end, said flange-like projection being engagedly supported by the end of said inner cylindrical portion.

3. The device for connecting tubes or pipes according to claim 1, wherein said female coupler has a pair of projections formed on the outer periphery.

4. The device for connecting together tubes or pipes according to claim 1, wherein said male coupler has a flange with said locking projection extending axially therefrom, said flange being formed to make contact with the end of said female coupler, said locking projection of said male coupler being engaged in the inlet of said engagement notch of said female coupler during connection of said male and female couplers.

5. The device as set forth in claim 1 wherein said couplers are formed of resilient plastic resin, and wherein the locking projection is integral with said male coupler.

* * * * *